United States Patent

[11] 3,626,823

[72] Inventor Andrew A. Toth
3505 Springbrook Drive, South Bend, Ind. 46614
[21] Appl. No. 7,660
[22] Filed Feb. 2, 1970
[45] Patented Dec. 14, 1971

[54] COMBINATION STORM WATER RETENTION ASSEMBLY AND SIDEWALK
8 Claims, 8 Drawing Figs.
[52] U.S. Cl. .................................................. 94/31.1,
61/11, 94/2, 94/26, 94/33
[51] Int. Cl. ...................................................... E01c 11/24
[50] Field of Search............................................ 94/2, 4, 11,
31, 33, 26, 31.1, 31.3; 61/10, 11, 13

[56] References Cited
UNITED STATES PATENTS

| | | | |
|---|---|---|---|
| 454,745 | 6/1891 | Lee ............................... | 94/33 X |
| 752,911 | 2/1904 | Marriott ....................... | 94/31.1 |
| 809,201 | 1/1906 | Lutz ............................. | 94/31.1 |
| 881,700 | 3/1908 | Miller........................... | 94/26 X |
| 2,174,035 | 9/1939 | Henderson ................... | 94/2 |
| 2,994,254 | 8/1961 | Schumaker................... | 94/4 X |

Primary Examiner—Jacob L. Nackenoff
Attorney—Shlesinger, Arkwright & Garvey

ABSTRACT: This invention includes a series of longitudinally aligned double-tee sections, each of which includes an upper horizontal section at ground level for accommodating pedestrian traffic, and spaced vertical supporting legs pending from the horizontal section below ground level. There is a void between the support legs forming a dry well for receiving runoff water. The support legs are perforate for releasing collected water into an adjacent stone or gravel bed for absorption purposes. A catch basin located either inside or outside the double-tee section receives the runoff water and feeds it to the dry well, the catch basin collecting and retaining debris and sediment for ready removal.

INVENTOR.
Andrew A. Toth

BY
Shlesinger, Arkwright & Garvey
ATTORNEYS

Patented Dec. 14, 1971

INVENTOR.
Andrew A. Toth

BY

ATTORNEYS

COMBINATION STORM WATER RETENTION ASSEMBLY AND SIDEWALK

BACKGROUND AND OBJECTS

With the continued construction of urban communities including buildings, roadways, etc., more and more of the soil surface has been sealed, thereby preventing absorption of water runoff into the soil. Usually, this water runoff is accommodated in a combined sanitary and storm sewer. However, during rainfall, it has been found that the sewage-mixed polluted rainwater overloads sewage disposal plant facilities, and runs into streams and rivers, causing pollution.

It is an object of this invention to provide a combination storm water retention assembly and sidewalk for collecting rainwater near its gathering source and allowing it to gradually seep into the surrounding soil.

Another object is to separate runoff water from the sanitary sewer system to alleviate overloads on sewage disposal plants, and eliminate the flow of sewage-mixed rainwater into streams.

A further object is to provide a system of the character described including a horizontal ground level section which serves as a walking surface or sidewalk, and spaced vertical legs which extend downwardly from the horizontal section below ground level, a void being provided between the vertical sections, and stone or gravel beds adjacent and below the same, to afford a dry well to receive the runoff water for absorption into the surrounding ground.

A still further object is to provide a catch basin in association with the dry well, which basin collects the runoff water and removes debris and sediment therefrom, prior to feeding the water into the dry well.

Other objects are to provide an assembly of the character described wherein the spaced, vertical legs are of perforate construction, for releasing collected water into an adjacent stone or gravel bed for absorption purposes; to provide an assembly which, when laid on an inclined surface, is adapted to receive water stop baffles at intervals, for retaining water in a step arrangement between the baffles, and to provide an assembly which is comprised of a plurality of preformed sections which may be readily installed without affecting existing roadways and with a minimum of inconvenience to the public.

Other objects will be manifest from the following presently preferred forms of the present invention taken in conjunction with the appended drawings.

DESCRIPTION OF FIGURES OF DRAWING

Figure 1:
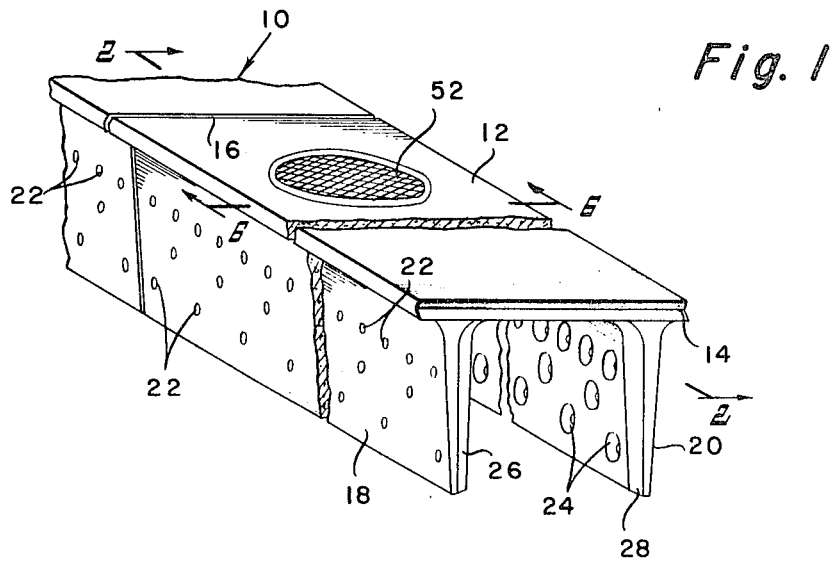
FIG. 1 is a fragmentary, perspective view of double-tee sections forming part of the combination storm water retention and sidewalk of the present invention.

The assembly of the present invention includes a plurality of double-tee sections generally designated 10 constructed of precast prestressed reinforced concrete.

Double-tee section 10 includes an upper horizontal section 12 providing a walking surface. One terminal of horizontal section 12 is provided with a lateral V-shaped groove 14, and the opposite terminal thereof is provided with a complemental lateral V-shaped projection 16 adapted for engagement in a complemental groove 14 of an adjacent section.

Double-tee section 10 further includes a pair of like, spaced vertical legs 18 and 20 which are coextensive with horizontal section 12. Legs 18 and 20 are provided with a plurality of cone-shaped openings designated 22 and 24 respectively, for purposes which will be hereinafter more fully set out. The terminals of legs 18 and 20 are beveled as indicated at 26 and 28.

Figure 6:
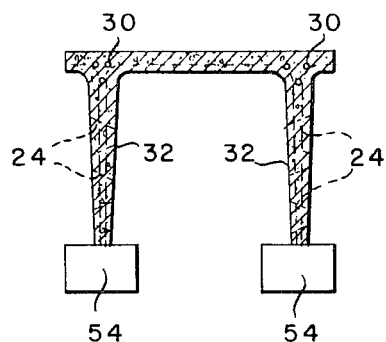
FIG. 6 is a transverse sectional view taken along the line 6—6 of FIG. 1, looking in the direction of the arrows.

As indicated in FIG. 6, double-tee section 10 may be reinforced by longitudinally extending reinforcing members 30 and vertical reinforcing members 32.

Figure 3:
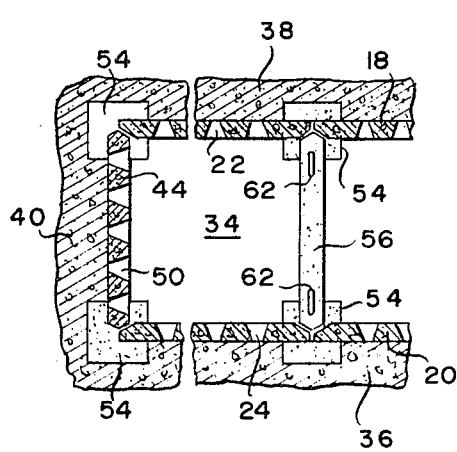
FIG. 3 is a top plan view of the double-tee section of the present invention, with the horizontal to section thereof removed.

The double-tee section of the present invention is adapted to be placed in a trench having a base, stone or gravel bed 34, side stone or gravel beds 36 and 38, and an end stone or gravel bed 40 (See FIG. 3).

An end closure for the double-tee section is indicated at 44, which end closure is of generally rectangular construction, the lateral edges of which are beveled at 46 and 48, the body portion thereof being provided with a plurality of cone-shaped openings 50 to permit flow of water therethrough into end stone or gravel bed 40.

Selected double-tee sections may be provided with a manhole cover 52.

In order to lay the assembly of the present invention, concrete precast blocks 54 are positioned on base bed 34 at intervals, each block being located to lie at the intersection of two adjacent double-tee sections.

Sections 10 may be of any desired length, the particular length being determined by construction and installation conditions. Installation may be readily effected by means of hooks which may be inserted through cone-shaped openings 22 and 24, the hooks being connected to crane cables or the like. If desired, the joints between adjacent double-tee sections may be cement caulked for a positive seal.

When the double-tee section of the present invention is installed, horizontal section 12 is at ground level and of a width suitable for accommodating pedestrian traffic and thereby functioning as a sidewalk.

Figure 2:
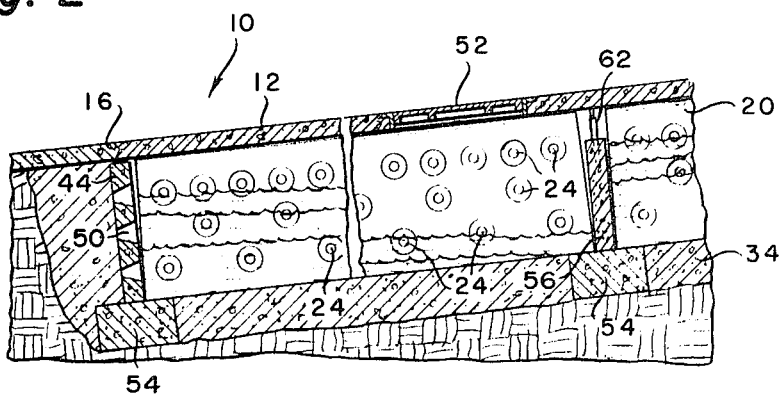
FIG. 2 is a longitudinal sectional view taken along the line 2—2 of FIG. 1, looking in the direction of the arrows, and showing the double-tee sections installed in the ground.
Figure 4:
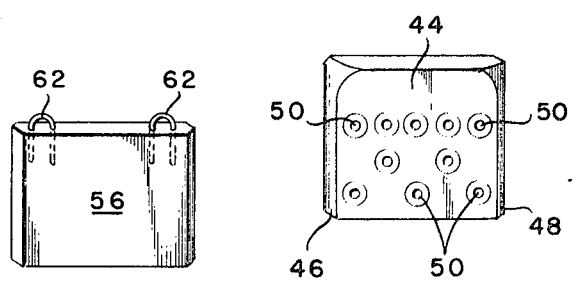
FIG. 4 is a side elevational view of a baffle forming a part of the present invention.
Figure 5:
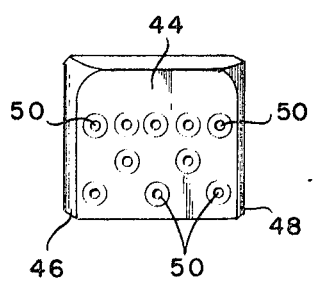
FIG. 5 is a side elevational view of an end closure forming a part of the present invention.

As shown to advantage in FIG. 2, when the assembly of the present invention is to be installed on a sloping terrain, baffles may be employed to hold the water in a stepped formation to prevent collection thereof in one spot and assure proper soil absorption. This baffle is shown to advantage in FIG. 4 and includes an imperforate rectangular body section 56, the lateral edges of which are formed to provide V-shaped projections 58 and 60. The legs of spaced U-shaped steel rods 62 are anchored in the upper surface of baffle 56 for engagement with hooks or the like carried by a crane or other mechanical device for placing the baffle in position.

Baffles 56 are adapted to be placed in the V-shaped recesses formed by adjacent bevels 26 and 28 of double-tee sections 10, the lower terminal of each baffle being adapted to rest on a concrete precast block 24.

Figure 7:
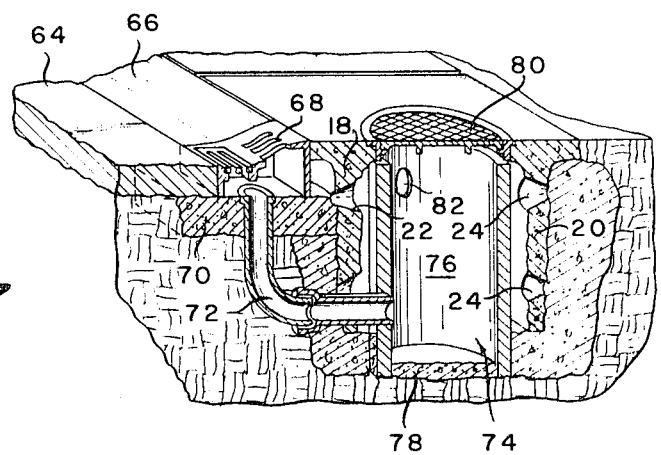
FIG. 7 is a fragmentary, sectional view illustrating one form of the assembly of the present invention.

In FIG. 7, there is illustrated the installation of the present invention on a site where conditions demand that the assembly be immediately adjacent a street 64 having a curb 66.

In this type of installation, a conventional curb drain is indicated at 68, the drain being positioned on a concrete platform 70 forming a chamber into which is cast a drainage pipe 72. Drainage pipe 72 extends downwardly into the soil and in a direction away from street 64 where it empties into a catch basin 74 which is located between vertical legs 18 and 20 of a double-tee section 10.

Catch basin 74 includes a cylindrical body 76 which extends from a point just below horizontal section 12 to a point below vertical legs 18 and 20, and is set in undisturbed soil. A concrete slab 78 is located in the bottom of the catch basin for stability and the provision of a serviceable surface for cleaning purposes. A manhole cover 80 is positioned in horizontal section 12 of double-tee section 10 superjacent the catch basin.

Catch basin 74 is further provided with a plurality of holes 82 located in the wall of cylindrical vessel 76 to allow the flow of water therethrough into the dry well formed by the present invention, for absorption into the surrounding soil.

It will be noted from a consideration of the drawing that any debris, sediment or other foreign material collected in catch basin 74 will be retained therein, and may be readily removed by vacuum or manual means upon removal of manhole cover 80.

Figure 8:
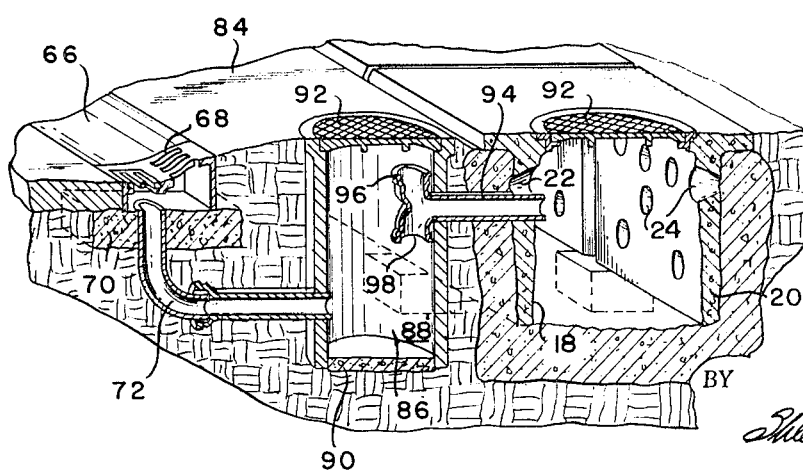
FIG. 8 is a view similar to FIG. 7 illustrating another form of the assembly of the present invention.

In FIG. 8, there is illustrated the application of the assembly of the present invention on a site where conditions provide a parkway 84 between street curbing 66 and the public sidewalk created by double-tee section 10. In this application of the present invention, curb drain 68 having a concrete platform 70 and a drainage pipe 72 of similar construction to that illustrated in FIG. 6, is employed. In this form of the invention, however, a catch basin 86 is set into parkway 84, the catch basin including an imperforate cylindrical body 88 having a concrete slab bottom 90, over which is a manhole cover 92, to permit access to the catch basin for removal of debris and sediment. Drainage pipe 72 is in communication with the catch basin for feeding the runoff water to the catch basin.

A straight connecting pipe 94 extends from the upper side portion of the catch basin through leg 18 of double-tee section 10 into communication with the dry well formed by double-tee section 10. The terminal of connecting pipe 94 within catch basin 86 is branched to provide an upwardly extending member 96 and a downwardly extending member 98. Drainage pipe 72 and straight pipe 94 are in water-sealed relationship with catch basin 86.

With the assembly of the present invention, the excavation width on the sides of double-tee section 10 are made in accordance with various locations of the assembly involved and the prevailing rainfall as recorded. The excavated area adjacent legs 18 and 20 is then filled with stone, gravel or crushed rock for rapid absorption of the collected drainage water deposited from the impervious surfaces through the curb drain into the catch basin, and from there into the dry well.

The assembly of the present invention is preferably of preformed concrete construction, the units thereof being readily installed in a trench by mechanical means. By virtue of the nature of the assembly, no crash program need be undertaken by a community installing the present invention, since any area can be developed by piecemeal installation, as funds are available, and can be carried out on a priority basis.

With the present invention, also, the needs of both the community and industry for clean water will be balanced with nature, as water tables in the soil will be harmonized with precipitation deposited thereon.

While there has been herein shown and described the presently preferred form of the present invention, it is to be understood that various changes may be made therein within the scope of the claims hereto appended.

What I claim is:

1. A combination storm water retention assembly and sidewalk for positioning in a ground trench, including:
   a. water-absorbent material at the bottom and sides of the trench,
   b. a plurality of units in aligned, longitudinal relationship in the ground trench,
   c. each of said units including an upper, flat section at ground level serving as a walking surface,
   d. a plurality of support members pending from said upper flat section into the trench,
   e. said support members being perforated to permit passage of water therethrough into the water absorbent material at the sides of the ground trench,
   f. said support members being in substantially parallel spaced relationship and extending longitudinally of the unit,
   g. whereby a channel is formed between said support members, said upper flat section and the bottom of the trench,
   h. catch means adjacent said unit for receiving surface runoff water, and
   i. means for feeding said water from said catch means into the channel,
   j. whereby surface water is retained within the assembly and permitted to percolate through said absorbent material into the bottom of the trench and through the perforations of said support members at the sides of the trench.

2. The combination water retention assembly and sidewalk of claim 1, wherein:
   a. each of said units is of precast double-tee construction.

3. The combination storm water retention assembly and sidewalk of claim 1, wherein:
   a. said catch means comprises a drain and catch basin for receiving the runoff water located adjacent one of said units, and
   b. said means includes a pipe connecting said catch basin to the channel of said unit.

4. The combination storm water retention assembly and sidewalk of claim 1 wherein:
   a. said catch means comprises a catch basin positioned in the channel between said supporting members,
   b. openings in the wall of said catch basin to permit water to flow from said catch basin into the channel, and
   c. said catch means includes a drain at ground level for receiving runoff water, and
   d. a pipe extending from said drain to said catch basin for feeding the runoff water to said catch basin.

5. The combination storm water retention assembly and sidewalk of claim 1, wherein:
   a. said catch means includes a cylindrical vessel,
   b. a water inlet in said cylindrical vessel,
   c. a water outlet in the upper extremity of said cylindrical vessel, and
   d. a drain connected to the water inlet of said cylindrical vessel.

6. The combination storm water retention assembly and sidewalk of claim 1, with the addition of
   a. a manhole cover in said horizontal upper section superjacent said cylindrical vessel, for effecting removal of debris and sediment collected in said vessel.

7. The combination storm water retention assembly and sidewalk of claim 1, with the addition of
   a. a baffle placed in said channel in engagement with the bottom of the ground trench,
   b. said baffle including an imperforate body, the sides of which are in contiguous engagement with said support members, and the upper portion thereof being in spaced relation to the upper extremity of the channel,
   c. whereby when said assembly is located on a sloping terrain, water will be held in a stepped formation to prevent collection thereof in one spot and assure proper soil absorption.

8. The combination water retention assembly and sidewalk of claim 1, with the addition of:
   a. an end closure for said assembly at the end of the ground trench,
   b. said end closure including a rectangular member for positioning in the ground trench,
   c. said rectangular member being perforate to permit passage of water in the channel therethrough for percolation into the surrounding ground.

* * * * *